United States Patent
Hirata et al.

(10) Patent No.: US 7,811,350 B2
(45) Date of Patent: Oct. 12, 2010

(54) FILTER DEVICE, MANUFACTURING METHOD FOR THE SAME, AND FILTER ELEMENT SECURING TOOL

(75) Inventors: Ryu Hirata, Chiryu (JP); Kouichi Oda, Chita (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 308 days.

(21) Appl. No.: 11/959,944

(22) Filed: Dec. 19, 2007

(65) Prior Publication Data

US 2008/0141637 A1 Jun. 19, 2008

(30) Foreign Application Priority Data

Dec. 19, 2006 (JP) .............................. 2006-341469

(51) Int. Cl.
*B01D 46/00* (2006.01)
(52) U.S. Cl. .............................. 55/495; 55/501; 55/508; 55/511; 55/DIG. 5; 96/134
(58) Field of Classification Search .................... 55/495, 55/301, 490–493, 497, 501, 511, DIG. 5, 55/508; 96/134, 135, 147
See application file for complete search history.

(56) References Cited

U.S. PATENT DOCUMENTS 6,592,655 B2 7/2003 Iriyama et al.

2004/0256046 A1 * 12/2004 Sakakibara ................ 156/73.6
2005/0279210 A1 * 12/2005 Hirata ........................ 96/138
2007/0114169 A1 * 5/2007 Suzuki et al. ............... 210/441

FOREIGN PATENT DOCUMENTS

| JP | 2002-266713 | 9/2002 |
|---|---|---|
| JP | 2003-042017 | 2/2003 |
| JP | 2006-002730 | 1/2006 |

OTHER PUBLICATIONS

English language Abstract of JP 2002-266713.
English language Abstract of JP 2006-002730.
English language Abstract of JP 2003-042017.

* cited by examiner

*Primary Examiner*—Duane Smith
*Assistant Examiner*—Tiffany N Palmer
(74) *Attorney, Agent, or Firm*—Greenblum & Bernstein, P.L.C.

(57) ABSTRACT

A sheet-like filter element is installed on a support within the casing of a filter device. A plate-like portion is integrally formed in at least the outer periphery of the filter element. A crimped portion which is to be secured to the support in a crimped state is formed in this plate-like portion. A protrusion which rises through the above described plate-like portion is formed so as to be integrated with the above described support around this crimped portion. The plate-like portion is secured to the support by means of this protrusion.

14 Claims, 7 Drawing Sheets

FILTER DEVICE, MANUFACTURING METHOD FOR THE SAME, AND FILTER ELEMENT SECURING TOOL

BACKGROUND OF THE INVENTION

1. Technical Field

The present invention relates to a filter device in which a sheet-like filter element is installed inside a casing, a manufacturing method for manufacturing the filter device, and a filter element securing tool used for securing a filter element to the above described casing.

2. Background Art

As a filter device of a conventional type, one having the structure disclosed in, for example, Japanese Laid-Open Patent Publication No. 2002-266713, has been proposed. In the conventional configuration described in this publication, a filter element for filtering air that has been taken in is installed inside the casing so as to cross the air flow path. In addition, a fuel adsorbing sheet forming a filter element is installed downstream from the filter element so as to cross the air flow path, in order to adsorb fuel vapor that leaks out from the air intake system of the engine.

A separate resin frame is attached on the entirety of the outer periphery of the above described fuel adsorbing sheet, and a plurality of attachment holes are created in this resin frame. In addition, when the fuel adsorbing sheet is attached inside the casing, the above described resin frame is placed on a support within the casing, and pins of the support are inserted in the respective attachment holes in this resin frame. In this state, the end portions of the respective pins are heated so as to be swaged, and thus, the fuel adsorbing sheet is secured on the support inside the casing.

In the conventional configuration described in this publication, however, it is necessary to prepare a resin frame which is separate from the fuel adsorbing sheet, and then attach the resin frame to the fuel adsorbing sheet, and create a plurality of attachment holes in this resin frame. As a result, the number of parts increases and processing is troublesome, leading to a problem of high manufacturing costs. In addition, a plurality of the above described number of attachment holes are created in the above described resin frame, and therefore, the strength of the resin frame, thus the strength of the outer periphery of the fuel absorbing sheet, may become lower, even in the case where a hard resin is used for the resin frame.

In order to deal with these problems, filter devices such as one disclosed in, for example, Japanese Laid-Open Patent Publication No. 2006-2730 have also been proposed conventionally. In the conventional configuration in this document, the outer periphery of the fuel adsorbing sheet that forms a filter element is thermally pressed so that a plate-like portion is integrally formed with the outer periphery. In addition, when the fuel adsorbing sheet is attached inside the casing, the plate-like portion of the fuel adsorbing sheet is placed on a support inside the casing, and in this state, the plate-like portion is welded to the support through ultrasonic welding or the like, so that the fuel adsorbing sheet is secured on the support inside the casing.

In the conventional configuration of the above described Patent Document 2, however, ultrasonic waves are only applied to the area where the plate-like portion of the outer periphery of the fuel adsorbing sheet and the support inside the casing make contact. Accordingly, the above described support and plate-like portion are joined only in the area where these make contact, and the strength with which the filter element is attached is not satisfactory.

SUMMARY OF THE INVENTION

This invention is provided by focusing on these problems with the prior art technology. An objective of the invention is to provide a filter device and a manufacturing method for the same in which the number of parts in the filter element is small, processing is easy, and in addition, the filter element can be firmly secured to the support inside the casing.

Another objective of the present invention is to provide a filter element securing tool which is appropriate for the above described filter device and the manufacturing method for the same.

To achieve the above described objectives, and in accordance with a first aspect of the present invention, a filter device in which a sheet-like filter element is installed on a support inside a casing is provided. The device includes a plate-like portion which is integrally formed in at least an outer periphery of the filter element, a crimped portion which is formed in the plate-like portion and secured to the support in a crimped state, and a protrusion which is integrally formed with the support around the crimped portion and rises through the plate-like portion. The plate-like portion is secured to the support by means of the protrusion.

In accordance with a second aspect of the present invention, a manufacturing method for a filter device in which a sheet-like filter element is installed on a support inside a casing is provided. A plate-like portion of the filter element is pressed against the support of the casing while being heated, so that a crimped portion that is secured to the support is formed in the plate-like portion, and a protrusion which rises through the plate-like portion is formed around the crimped portion in such a manner that the plate-like portion is secured to the support by means of the protrusion.

In accordance with a third aspect of the present invention, a filter element securing tool is provided that is used, in a filter device in which a sheet-like filter element is placed on a support in a casing, for heating and securing a sheet-like filter element to the support of the casing. A pressing protrusion and an annular rib, which is located around the pressing protrusion with an annular space in between, are provided on an end surface in such a manner that the pressing protrusion protrudes further than a distal end of the annular rib.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2(*a*) is an enlarged cross-sectional view showing a portion of a second filter element in the filter device of FIG. 1;

FIG. 2(*b*) is a partial cross-sectional view showing a portion before the formation of a plate-like portion through welding;

FIG. 4(*a*) is an enlarged cross-sectional view showing a portion of the filter device of FIG. 1 to which a second filter element is secured;

FIG. 4(b) is a further enlarged cross-sectional view showing a portion shown in FIG. 4(a) to which the second filter element is attached;

DETAILED DESCRIPTION OF THE PREFERRED EMBODIMENTS

First Embodiment

In the following, a first embodiment of the present invention will be described in reference to FIGS. 1 to 5. In the first embodiment, a filter device is incorporated in the air intake system of an engine.

Figure 1:
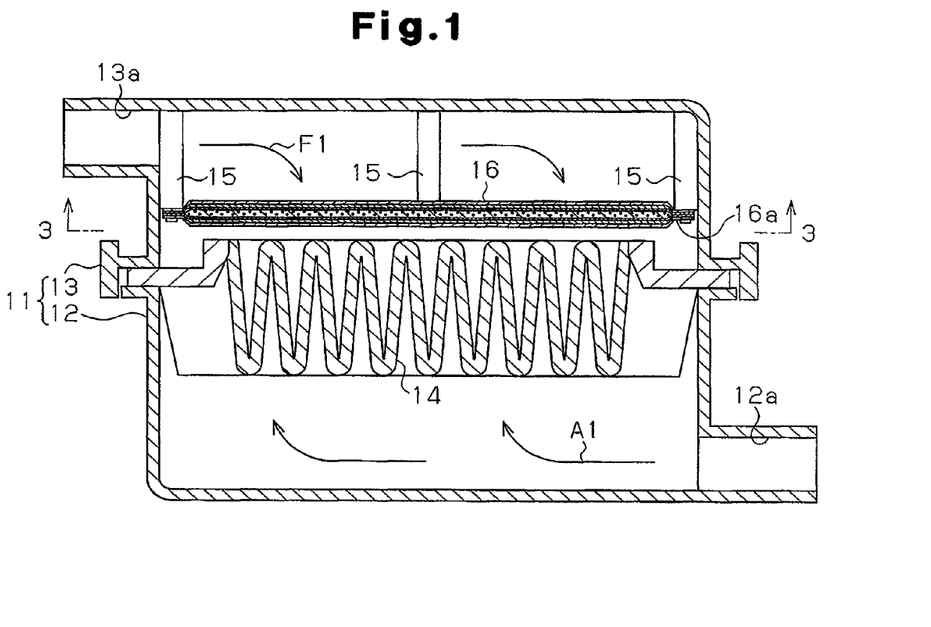
FIG. 1 is a cross-sectional view showing a filter device according to a first embodiment.

As shown in FIG. 1, a casing 11 of the filter device according to this embodiment is formed by mutually attaching a first casing member 12 having an inlet port 12a and an opening in the upper side to a second casing member 13 having an outlet port 13a and an opening in the lower side. That is, the first casing member 12 and the second casing member 13 are detachably coupled to each other with a clamp (not shown) in a state where the openings are aligned with each other.

Figure 3:
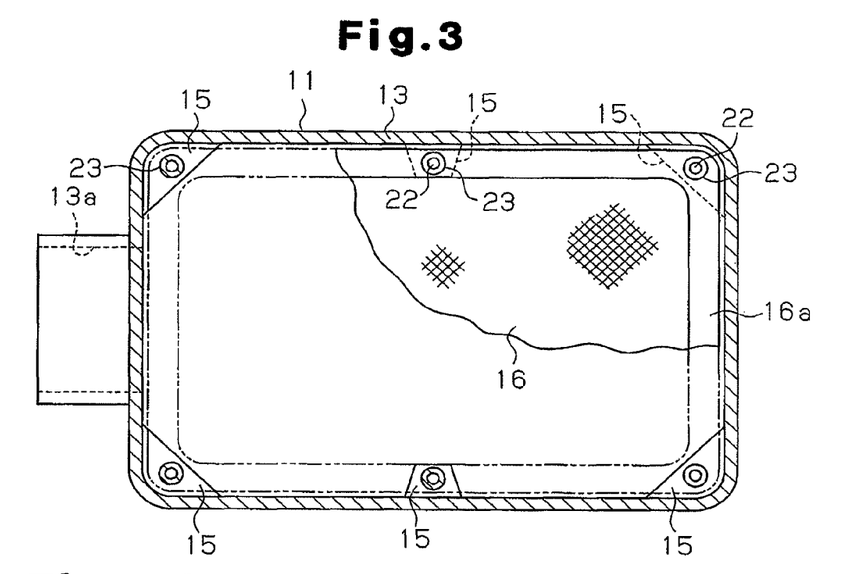
FIG. 3 is a cross-sectional view taken along line 3-3 of FIG. 1, with a part cut away.

As shown in FIGS. 1 and 3, a first filter element 14 made of unwoven cloth in a folded state with pleats is provided between the openings of the first casing member 12 and second casing member 13 so as to cross the air flow path starting from the inlet port 12a and reaching the outlet port 13a, so that air A1 that is drawn into the engine is filtered. The air flows from the inlet port 12a to the outlet port 13a. A plurality of supports 15 are formed so as to protrude from the inner wall of the second casing member 13 and be located downstream from the first filter element 14. A second filter element 16, which is a fuel adsorbing sheet having air permeability, is installed on the supports 15 so as to cross the air flow path and adsorb fuel vapor F1 which leaks out from the air intake side of the engine.

Thus, the second filter element 16 and the related configuration will now be described in detail below.

Figure 2A:
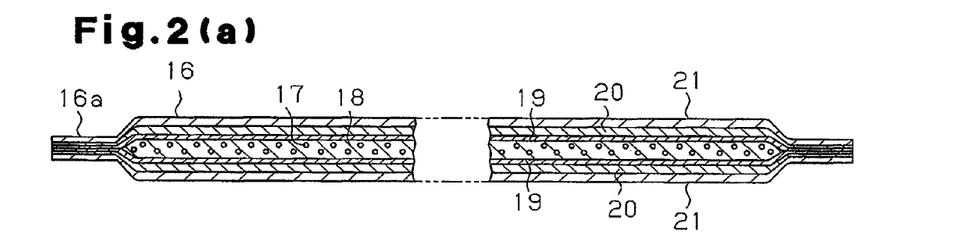
Figure 2B:
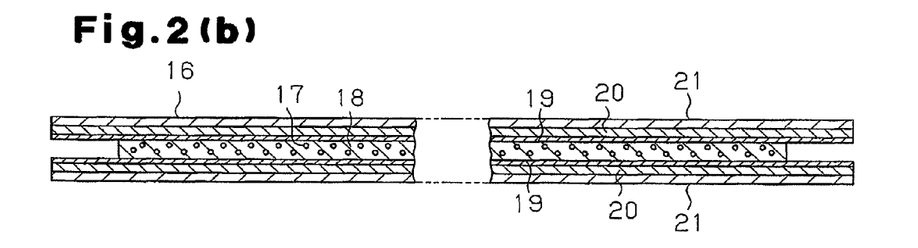

As shown in FIGS. 2(a) and 2(b), the second filter element 16 is provided with an adsorbing material 17 made of granular activated carbon for adsorbing fuel vapor in the center portion in the thickness direction. This adsorbing material 17 is sandwiched between a pair of first reinforcing nets 19 and secured with a binder (not shown). The first reinforcing nets 19 are formed of a material having a high strength and heat resistance, for example glass fibers or a metal, and glass fibers are used in this embodiment. The first reinforcing nets 19 are sandwiched between a pair of support sheets 20 made of unwoven cloth. The support sheets 20 are formed of PET (polyethylene terephthalate). Furthermore, each of the support sheets 20 is sandwiched between a pair of second reinforcing nets 21 on the outside having heat resistance, in order to protect the second filter element 16 from backfire flames and pressure. The second reinforcing nets 21 are formed of PP (polypropylene).

A plate-like portion 16a in loop form where there is no adsorbing material 17 is formed by thermally pressing the entirety of the outer periphery of the second filter element 16. FIG. 2(b) shows the second filter element 16 in the state before the outer periphery is thermally pressed as described above. This plate-like portion 16a is formed of the support sheets 20 and the second reinforcing nets 21 which are welded together so as to be thinner than portions (filtering portion) other than the plate-like portion 16a. The first reinforcing nets 19 maintain a non-welded state. In addition, although the plate-like portion 16a is formed so as to be flat through welding, gaps between fibers in the unwoven cloth which forms the support sheets 20 and the net mesh in the second reinforcing nets 21 remain to a certain extent. In addition, air passes through these gaps and the net mesh when air is taken into the engine, and thus, the flow of air becomes stable without disturbance. In addition, the first reinforcing nets 19 are not welded, and therefore, the form of net mesh is maintained unchanged.

Figures 4A, 4B:
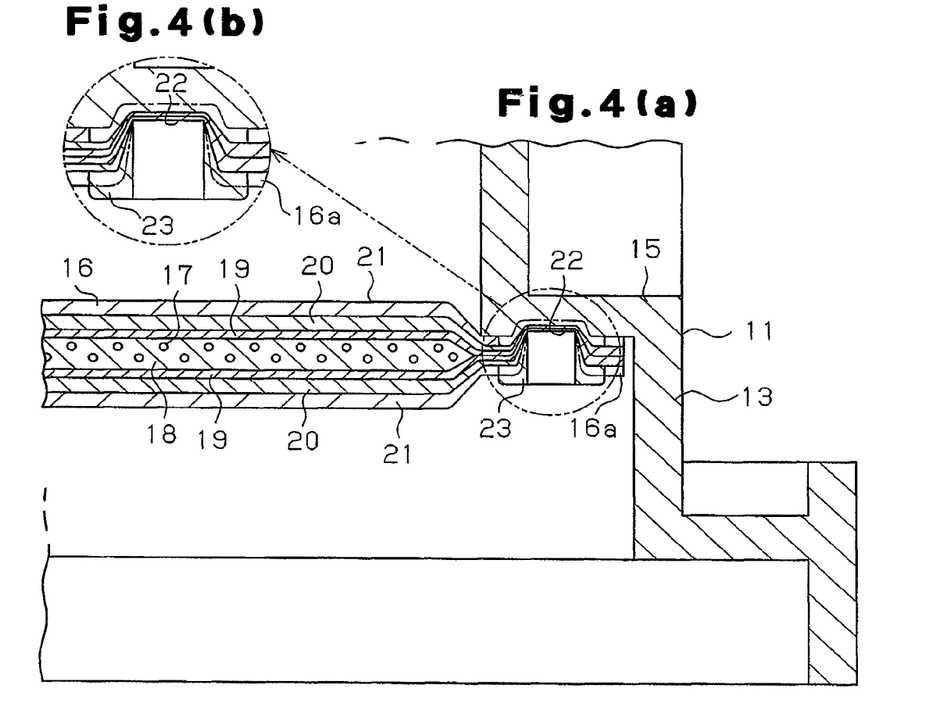
Figure 5A:
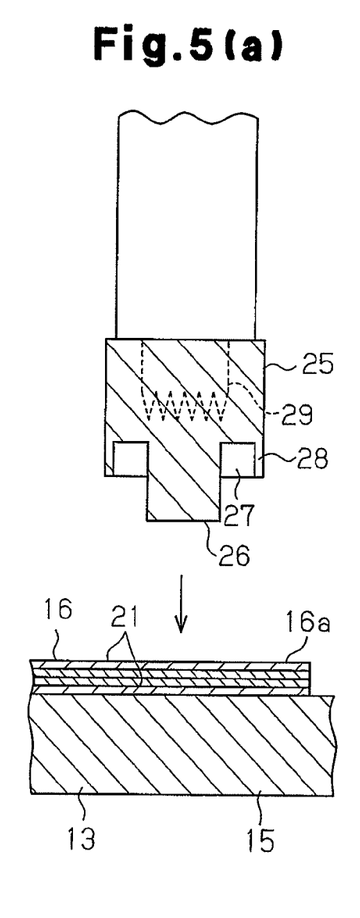
FIGS. 5(a) to 5(c) are partial cross-sectional views showing a portion for illustrating in sequence the method for securing the second filter element to the support inside the casing using a filter element securing tool.
Figure 5B:
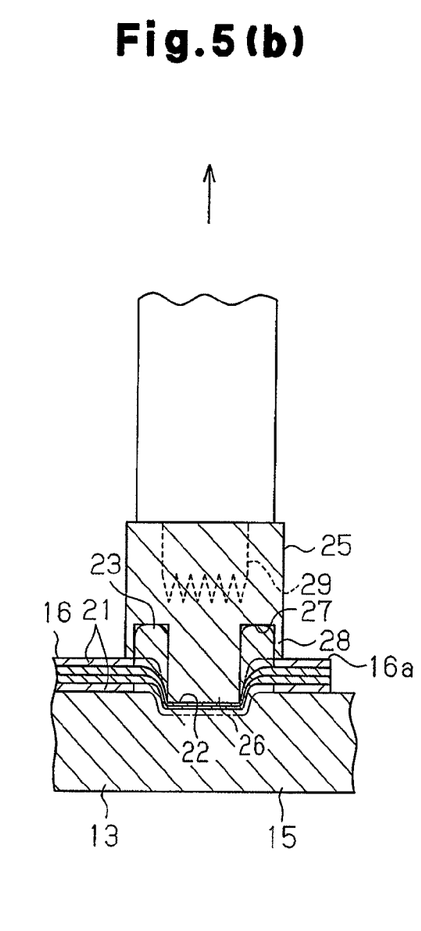
Figure 5C:
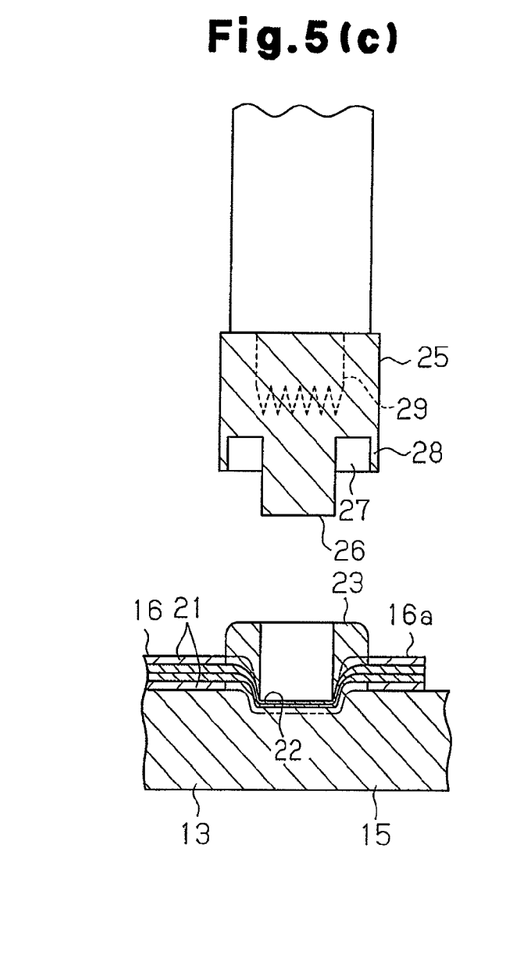

When the second filter element 16 is attached inside the casing 11, as shown in FIG. 5(a), the plate-like portion 16a of the second filter element 16 is placed on the supports 15 within the second casing member 13. In this state, as shown in FIG. 5(b), predetermined portions of the plate-like portion 16a of the second filter element 16 are heated and pressed against the supports 15 using a securing tool 25 having a circular cross section. Through this application of heat and pressure, as shown in FIGS. 4 and 5(c), circular crimped portions 22 are created in the plate-like portion 16a so as to be crimped on the supports 15, and circular protrusions 23 which are integrated with the portions of the plate-like portion 16a are created on the supports 15 around these crimped portions 22. As a result, as described below, the plate-like portion 16a of the second filter element 16 is firmly secured on the supports 15 inside the second casing member 13.

As shown in FIGS. 5(a) to 5(c), a columnar pressing protrusion 26 is formed in the center portion of the end surface of the securing tool 25, and an annular rib 28 is formed around this pressing protrusion 26 with an annular space 27 in between. In addition, the pressing protrusion 26 is formed such that it protrudes from the end of the annular rib 28 and also that the volume of the annular space 27 becomes greater than the volume of the portion of the pressing protrusion 26 which protrudes from the end of the annular rib 28. For example, the pressing protrusion 26 may be formed such that the volume of the annular space 27 is 1.5 times greater than the volume of the portion of the pressing protrusion 26 that protrudes from the end of the annular rib 28. In addition, a heater 29 for heating is embedded at the end of the securing tool 25.

When the plate-like portion 16a of the second filter element 16 is heated and pressed against the supports 15 using this securing tool 25, as shown in FIG. 5(b), the portions of the plate-like portion 16a which are pressed by the pressing protrusions 26 are crimped on the supports 15 while being melted, and the portions of the supports 15 which are pressed are also melted. As a result, the portions of the supports 15 and the plate-like portion 16a which are pressed are dented, so that the crimped portions 22, which are circular as viewed from above, are created in the plate-like portion 16a. At this time, the first reinforcing nets 19 are not melted, and keep their net form. The melted portion of the supports 15 are integrated with the melted portions of the plate-like portion 16a around the crimped portions 22, and pass through the remaining gaps in the support sheets 20 in the plate-like portion 16a, the remaining net mesh of the second reinforcing nets 21 and the net mesh of the first reinforcing nets 19. In addition, these melted portions enter the annular spaces 27 in the filter element securing tool 25 so as to form rising portions. After that, as shown in FIG. 5(c), the melted portions are solidified, and thus, annular protrusions 23, which are integrated with the plate-like portion 16a around the crimped portions 22 and press the plate-like portion 16a from the upper surface, are created. Accordingly, the plate-like portion 16a is secured between the supports 15 and the protrusions 23.

In this case, the securing tool is formed in such a manner that the volume of the annular space 27 is greater than the volume of the portion of the pressing protrusion 26 that protrudes from the end of the annular rib 28, and therefore, the rising portions created around the crimped portions 22 do not protrude outward from the annular ribs 28, and are contained inside the annular spaces 27 when converted into the protrusions 23. In this manner, the protrusions 23 are prevented from protruding the annular spaces 27, and thus, burrs, which do not contribute to securing of the plate-like portion 16a, are prevented from being created around the crimped portions 22. Accordingly, the second filter element 16 is firmly secured to the supports 15.

In addition, as shown in FIGS. 4 and 5(c), in the portions of the crimped portions 22 and the protrusions 23, the first reinforcing nets 19 of the plate-like portion 16a are not melted, as described above, and thus remain in a non-melted state and are placed so as to cross over the crimped portions 22. Accordingly, the strength of the plate-like portion 16a is maintained, and the strength with which the second filter element 16 is secured to the supports 15 is further increased.

Furthermore, in this filter device, it is not necessary to coat the outer periphery of the second filter element 16 with a resin frame, or to create a plurality of attachment holes which extend through such a resin frame. Accordingly, the second filter element 16 is easily processed, and the cost for manufacturing the second filter element 16 is reduced.

The first embodiment has the advantages listed below.

(1) It is not necessary to provide a resin frame in the outer periphery of the filter element 16 or create a number of attachment holes which extend through such a resin frame, and therefore, the processing, that is, the manufacture, of the filter element, is easy to carry out.

(2) Although recessed and crimped portions are formed in the plate-like portion 16a of the filter element 16, no through holes are created, and therefore, the strength of the plate-like portion 16a is prevented from being lowered.

(3) The protrusions 23 are integrated with the plate-like portion 16a of the filter element 16 in a melted state and solidified in this state, and therefore, the supports 15 and the plate-like portion 16a of the filter element 16 are integrated via the protrusions 23. In addition, the protrusions 23 rise and press the first reinforcing nets 19 of the plate-like portion 16a from above. Accordingly, the strength with which the filter element 16 is secured to the supports 15 is increased.

(4) The reinforcing nets 19 are placed in the portions of the crimped portions 22 and the protrusions 23 in a non-melted state, and therefore, the strength of the plate-like portion 16a is maintained, and the strength with which the filter element 16 is secured to the supports 15 is further increased.

(5) The crimped portions 22 of the filter element 16 are formed by means of the pressing protrusion 26 of the securing tool 25 when using the tool 25. In addition, the protrusions 23 are formed by means of the annular space 27 within the annular rib 28 of the tool 25. Accordingly, the filter element 16 is easily and firmly secured to the supports 15 simply by pressing the plate-like portion 16a with the tool 25.

(6) The securing tool 25 is formed in such a manner that the volume of the annular space 27 is greater than the volume of the portion of the pressing protrusion 26 which protrudes from the end of the annular rib 28, and therefore, the protrusions 23 are formed within the annular spaces 27 without protruding from the annular spaces 27, and thus, burrs are prevented from being created in the protrusions 23.

Second Embodiment

Next, a second embodiment of this invention is described. The second and following embodiments are described focusing on portions which are different from those in the first embodiment.

Figures 6A, 6B:
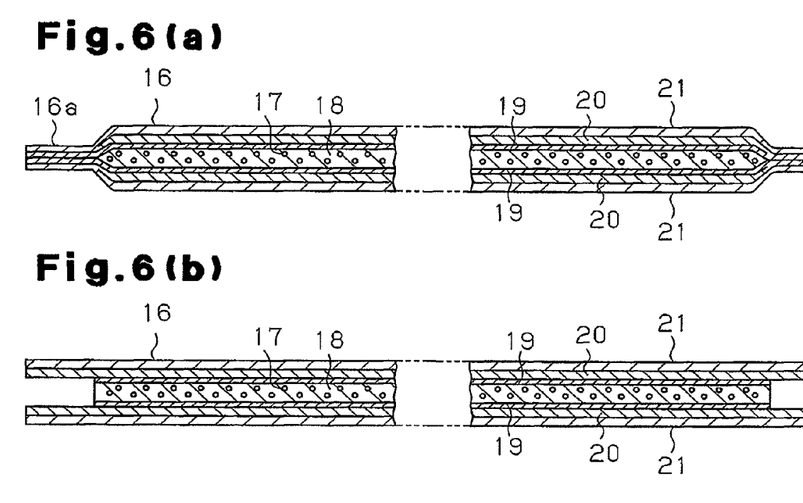
FIG. 6(a) is an enlarged cross-sectional view showing a portion of the second filter element in a filter device according to the second embodiment.
FIG. 6(b) is a partial cross-sectional view showing a portion before the formation of the plate-like portion through welding.

In the second embodiment, as shown in FIGS. 6(a) and 6(b), the first reinforcing nets 19 are formed so as to be smaller than the first reinforcing nets 19 in the first embodiment by the amount corresponding to the size of the plate-like portion 16a, and the first reinforcing nets 19 are not provided in the plate-like portion 16a. Accordingly, the two support sheets 20 are integrated in the plate-like portion 16a in a melted state without the first reinforcing nets 19 interfering, and therefore, lowering of the strength in the plate-like portion 16a due to the absence of first reinforcing nets 19 is compensated for.

Third Embodiment

Next, a third embodiment of this invention is described.

Figure 7:
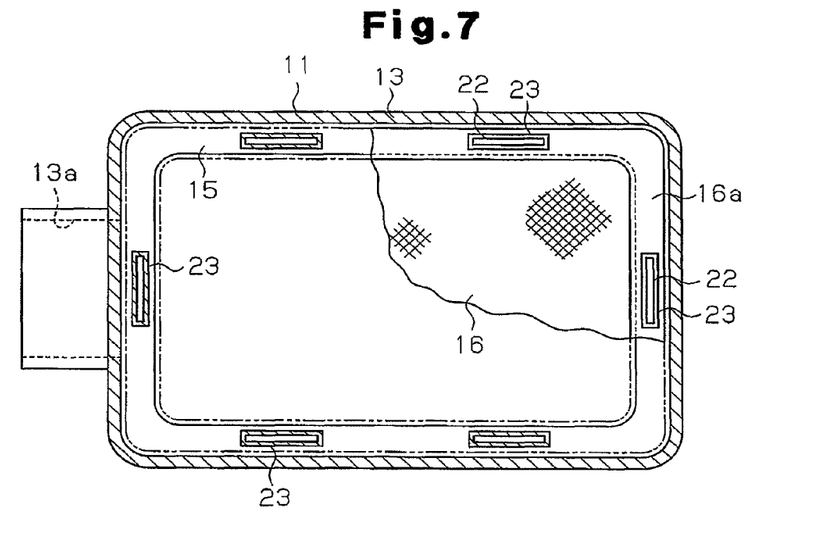
FIG. 7 is a partially broken cross-sectional view showing a portion of the filter device according to a third embodiment.

In the third embodiment, as shown in FIG. 7, a supports 15 is in a loop form on the inner peripheral surface of the second casing member 13. In addition, the crimped portions 22 of the plate-like portion 16a are formed in flat rectangular form, and the protrusions 23 around these crimped portions 22 are formed in a rectangular loop form.

Accordingly, the second embodiment is different from the first embodiment only in the form of the crimped portions 22 and the protrusions 23, and therefore, approximately the same advantages as those described in the first embodiment are obtained.

Fourth Embodiment

Next, a fourth embodiment of this invention is described.

Figure 8:
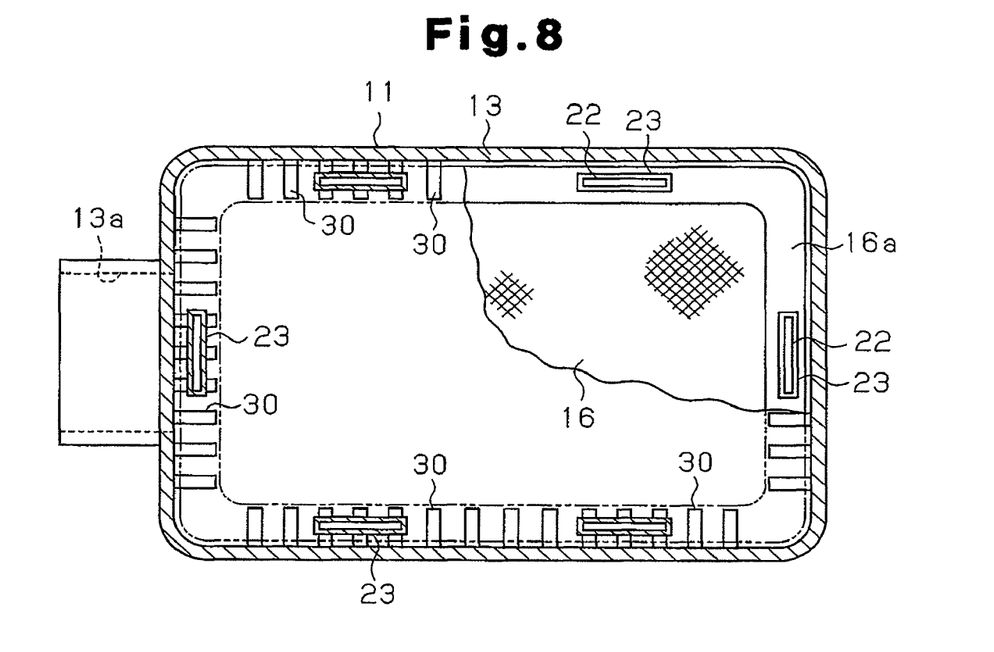
FIG. 8 is a partially broken cross-sectional view showing a portion of the filter device according to a fourth embodiment.

In the fourth embodiment, as shown in FIG. 8, reinforcing ribs 30 for securing rigidity are provided on the inner surface of the side walls of the first and second casing members 12 and 13 of the casing 11 (the first casing member 12 is not shown) so as to extend in the direction in which air flows. In addition, a plate-like portion 16a of the filter element 16 is installed on the reinforcing ribs 30, and this plate-like portion 16a is pressed in a heated state using the securing tool 25, so that the crimped portions 22 and the protrusions 23 are formed in the same manner as in the embodiments. Accordingly, in the fourth embodiment, the reinforcing ribs 30 function as supports to which the second filter element 16 is attached.

Accordingly, in the fourth embodiment, it is not necessary to provide dedicated supports for attaching the second filter element 16 on the inner surface of the second casing member 13. Therefore, it becomes possible to reduce pressure loss in the air flow inside the casing 11, and the second filter element 16, which does not have a resin frame, can be attached to the casing having a conventional configuration where no dedicated supports are provided.

Fifth Embodiment

Next, a fifth embodiment of this invention is described.

Figure 9:
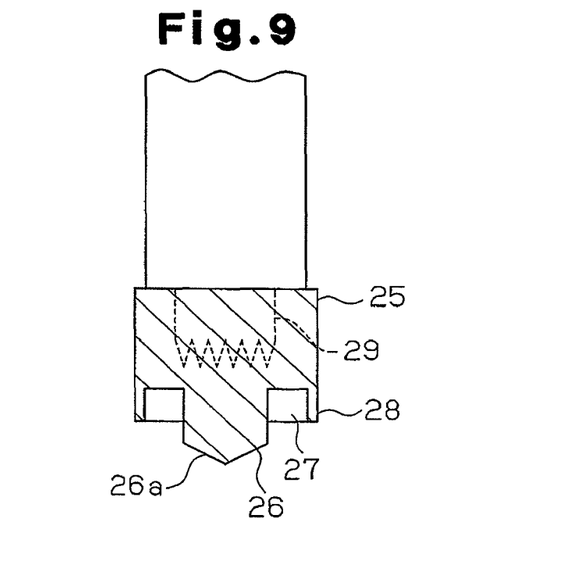
FIG. 9 is a partial cross-sectional view showing a portion of the filter element securing tool according to a fifth embodiment.

In the fifth embodiment, as shown in FIG. 9, a conical inclined surface 26a is formed on the end surface of the pressing protrusions 26 of the filter element securing tool 25. Accordingly, the rising portions around the crimped portions 22 move along the inclined surface 26a at the end of the pressing protrusions 26 so as to be smoothly contained within the annular spaces 27.

Modifications

It should be apparent to those skilled in the art that the present invention may be embodied in many other specific forms without departing from the spirit or scope of the invention. Particularly, it should be understood that the invention may be embodied in the following forms.

It is also possible for the filter device to be embodied in such a manner that the configuration of respective portions is modified as follows.

Figure 10:
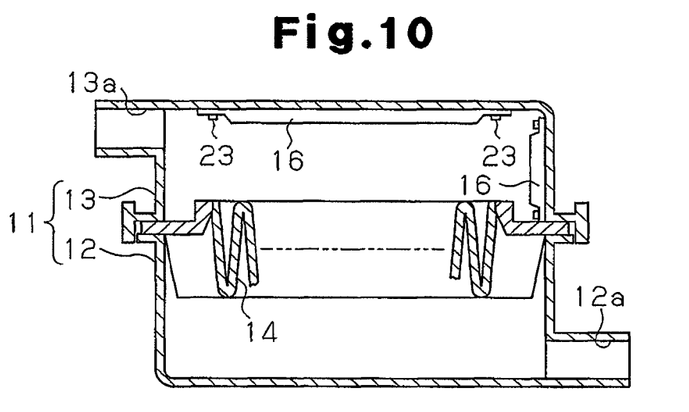
FIG. 10 is a cross-sectional view showing the filter device according to the first modification.

As shown in FIG. 10, the inner surface of the second casing member 13 may be used as a support. That is, a plurality of second filter elements 16 may be secured directly to the top portion and the side portions on the inner surface of the second casing member 13 so as to be downstream from the first filter element 14. Accordingly, the protrusions 23 are formed on the inner surface of the second casing member 13. In the case of this configuration, it is not necessary to form supports 15 inside the second casing member 13, and the configuration for attaching the second filter elements 16 becomes simple. In addition, the second filter elements 16 are placed so as not to cross the air flow path, and therefore, pressure loss in the air flow is reduced.

Figure 11:
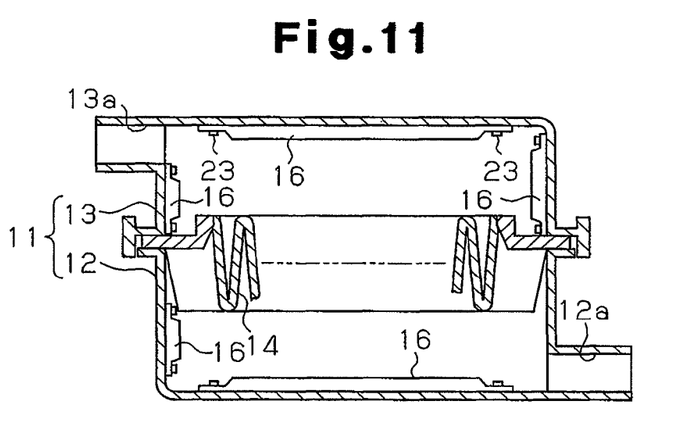
FIG. 11 is a cross-sectional view showing the filter device according to the second modification.

As shown in FIG. 11, the inner surfaces of the first casing member 12 and the second casing member 13 may be used as supports. That is, a plurality of second filter elements 16 may be placed and secured directly to the bottom portion and the side portions on the inner surface of the first casing member 12 and the top portion and the side portions on the inner surface of the second casing member 13. In the case of this configuration, in the same manner as in the case of FIG. 10, it is not necessary to form supports 15 inside the first casing member 12 and the second casing member 13, and thus, the configuration for attaching the second filter element 16 becomes simple, and pressure loss in the air flow is reduced.

Figure 12:
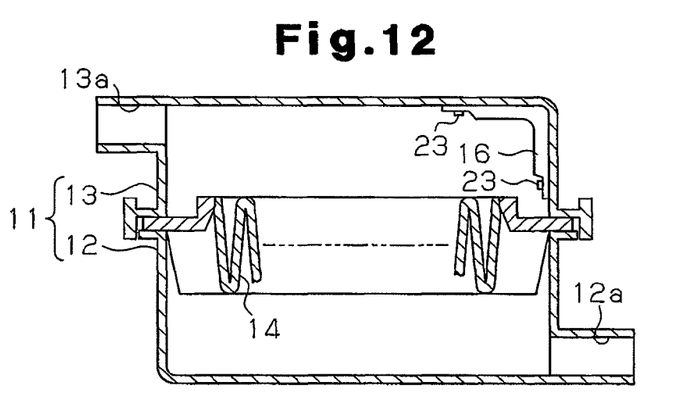
FIG. 12 is a cross-sectional view showing the filter device according to the third modification.

As shown in FIG. 12, a second filter element 16 in a bent state may be placed and secured directly in a corner portion on the inner surface of the second casing member 13 using the corner portion on the inner surface of the second casing member 13 as a support. In the case of this configuration, the configuration for attaching the second filter element 16 becomes simple, and the second filter element 16 is provided in a corner portion, and therefore, pressure loss in the air flow is further reduced. In addition, no resin frame is provided to the second filter element 16, unlike in the prior art, and therefore, the second filter element 16 is easily bent to an angle or to a curve for installment in a corner portion, as described above, or in a bent portion.

Figure 13:
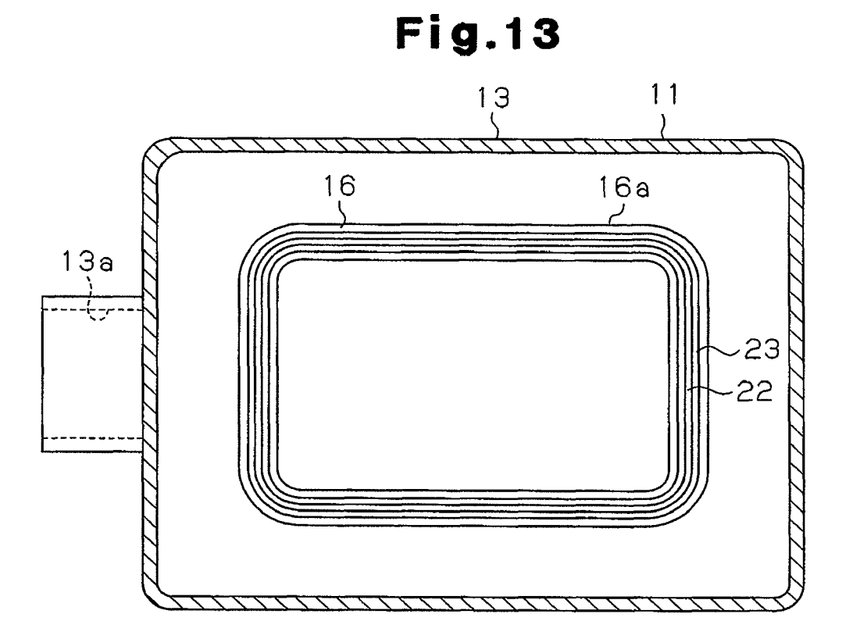
FIG. 13 is a cross-sectional view showing the filter device according to the fourth modification.

As shown in FIG. 13, a crimped portion 22 and a protrusion 23 may be formed in, for example, the example shown in FIG. 10, so as to be in a loop form and created around the entirety of the plate-like portion 16a. Thus, the strength with which the second filter element 16 is attached to the support is increased.

Figure 14:
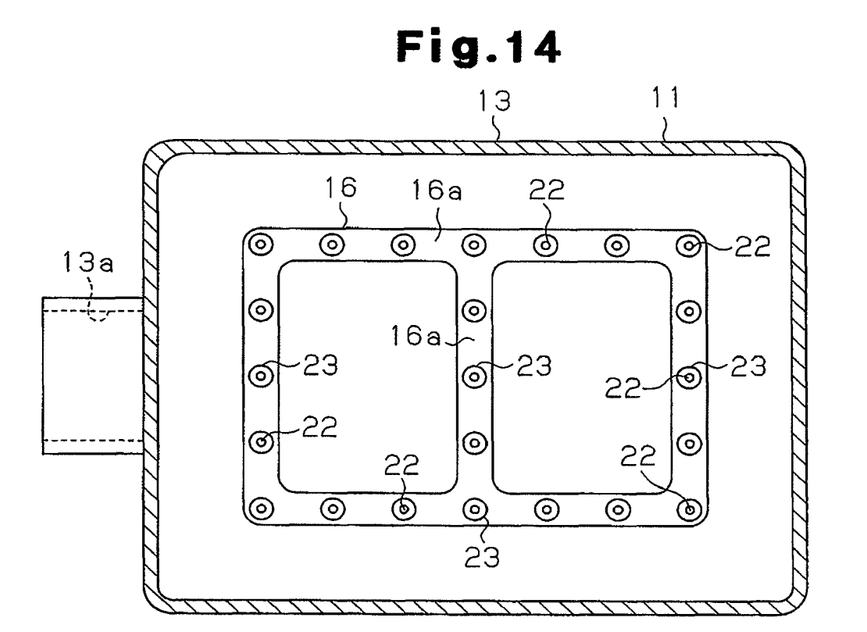
FIG. 14 is a cross-sectional view showing the filter device according to the fifth modification.

A plate-like portion 16a may be formed in a middle portion, in addition to the outer periphery of the second filter element 16, so that the plate-like portion 16a in this middle portion is also secured to a support on the inner wall surface or the like of the casing member 12 or 13 in the configuration. For example, as shown in FIG. 14, the plate-like portion 16a may be formed in a frame which connects the long sides or the short sides of the second filter element 16, in addition to the outer periphery of the second filter element 16. In this configuration also, the strength with which the second filter element 16 is attached to the casing 11 is increased. The plate-like portion 16a in locations other than the outer periphery of the second filter element 16 may be arranged in a form other than a frame, for example in an island form in the center portion of the second filter element 16.

Although in the above described embodiments, the first reinforcing nets 19 are provided on the two sides of the adsorbing material 18, a first reinforcing net may be provided on only one side.

Although in the above described embodiments, the plate-like portion 16a of the second filter element 16 is secured to the supports 15 inside the second casing member 13 by applying heat using the heater 29, other securing methods, such as ultrasonic welding, laser welding and impulse welding, may be used.

This invention may be embodied in a filter element for applications other than the filter element adopting fuel vapor, for example in a filter element for filtering dust.

Therefore, the present example and embodiments are to be considered as illustrative and not restrictive and the invention is not to be limited to the details given herein, but may be modified within the scope and equivalence of the appended claims.

The invention claimed is:

1. A filter device comprising:
a sheet-like filter element;
a casing having a support that attaches to the sheet-like filter element; and
a protrusion that attaches the sheet-like filter element to the support, wherein the sheet-like filter element includes:
a plate-like portion which is integrally formed in at least an outer periphery of the sheet-like filter element; and
a crimped portion which is formed in the plate-like portion and secured to the support in a crimped state, wherein
the protrusion extends through the crimped portion of the plate-like portion and is integrally formed with the support and the crimped portion, and wherein
the plate-like portion is secured to the support by the protrusion.

2. The filter device according to claim 1, wherein the crimped portion is formed by pressing the plate-like portion against the support in a heated state.

3. The filter device according to claim 2, wherein the protrusion is a portion of the support that solidifies after being melted and rising when the plate-like portion is pressed in a heated state.

4. The filter device according to claim 2, wherein the protrusion is a portion of the support that solidifies and is integrated with the plate-like portion after being melted together with the plate-like portion when the plate-like portion is pressed in a heated state.

5. The filter device according to claim 2, wherein the filter element is provided with a reinforcing net having resistance to heat, and the reinforcing net is placed in the crimped portion and the portion of the protrusion in a non-melted state.

6. A manufacturing method for a filter device in which a sheet-like filter element is installed on a support inside a casing, the method comprising:

pressing a plate-like portion of the sheet-like filter element against the support of the casing while being heated to attach the plate-like portion to the support, forming a crimped portion in the plate-like portion that is secured to the support, and forming a protrusion that extends through the plate-like portion of the sheet-like filter element and the crimped portion in such a manner that the plate-like portion is secured to the support by the protrusion.

7. A filter element securing tool for heating and securing the sheet-like filter element to the support of the casing, in the filter device according to claim 1, the filter element securing tool comprising:

a pressing protrusion and an annular rib projecting from the filter element securing tool, wherein the annular rib is located around the pressing protrusion with an annular space in between an inner peripheral surface of the annular rib and an outer peripheral surface of the pressing protrusion, and wherein the pressing protrusion and the annular rib are provided on an end surface of the filter element securing tool in such a manner that the pressing protrusion protrudes further than a distal end of the annular rib, and wherein the pressing protrusion and the annular rib form the crimped portion and the protrusion that extends through the plate-like portion to secure the sheet-like filter element to the support.

8. The filter element securing tool according to claim 7, the tool being formed in such a manner that the volume of the annular space is greater than the volume of the portion of the pressing protrusion that protrudes from the distal end of the annular rib.

9. The filter device according to claim 1, wherein the protrusion is formed to press the plate-like portion towards the support to secure the plate-like portion to the support.

10. The manufacturing method according to claim 6, wherein the protrusion presses the plate-like portion towards the support to secure the plate-like portion to the support.

11. The filter element securing tool according to claim 7 further including a heater.

12. A filter element securing tool for heating and securing the sheet-like filter element to the support of the casing in the manufacturing method according to claim 6, the filter element securing tool comprising:

a pressing protrusion and an annular rib projecting from the filter element securing tool, wherein the annular rib is located around the pressing protrusion with an annular space in between an inner peripheral surface of the annular rib and an outer peripheral surface of the pressing protrusion, and wherein the pressing protrusion and the annular rib are provided on an end surface of the filter element securing tool in such a manner that the pressing protrusion protrudes further than a distal end of the annular rib, and wherein when the pressing protrusion and the annular rib press the plate-like portion of the sheet-like filter element against the support of the casing, the pressing protrusion and the annular rib form the crimped portion and the protrusion that extends through the plate-like portion to secure the sheet-like filter element to the support.

13. The filter element securing tool according to claim 12, the tool being formed in such a manner that the volume of the annular space is greater than the volume of the portion of the pressing protrusion that protrudes from the distal end of the annular rib.

14. The filter element securing tool according to claim 12 further including a heater.

* * * * *